(No Model.) 6 Sheets—Sheet 3.
T. BRINING.
MACHINE FOR LASTING BOOTS OR SHOES.
No. 412,236. Patented Oct. 8, 1889.
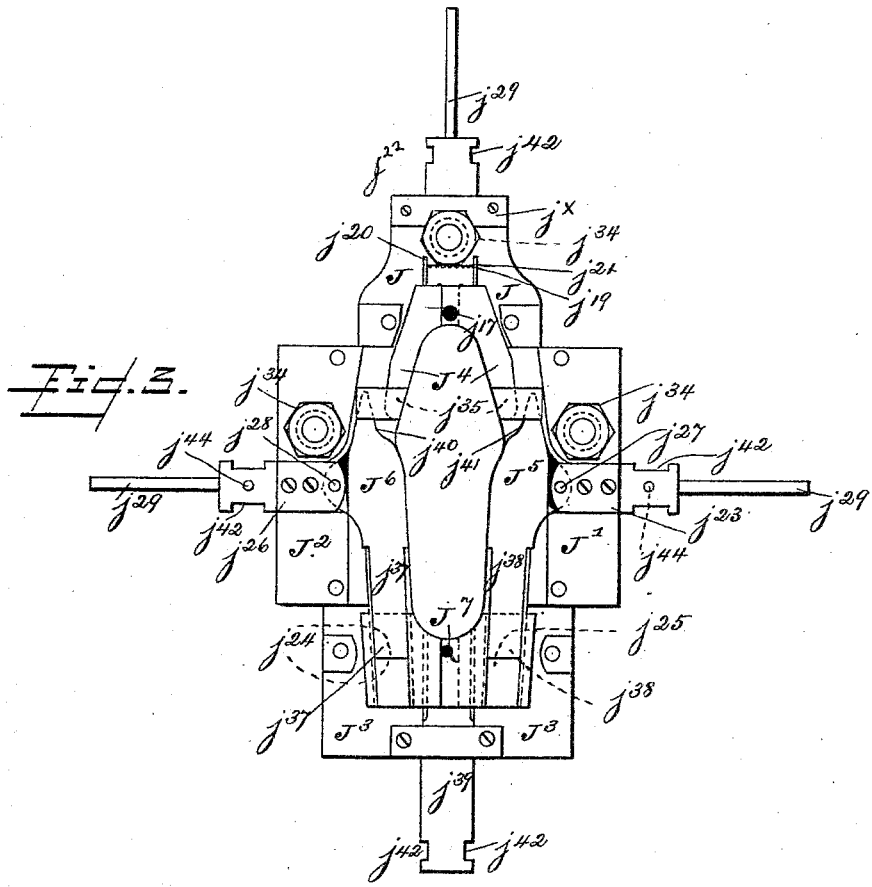
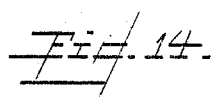

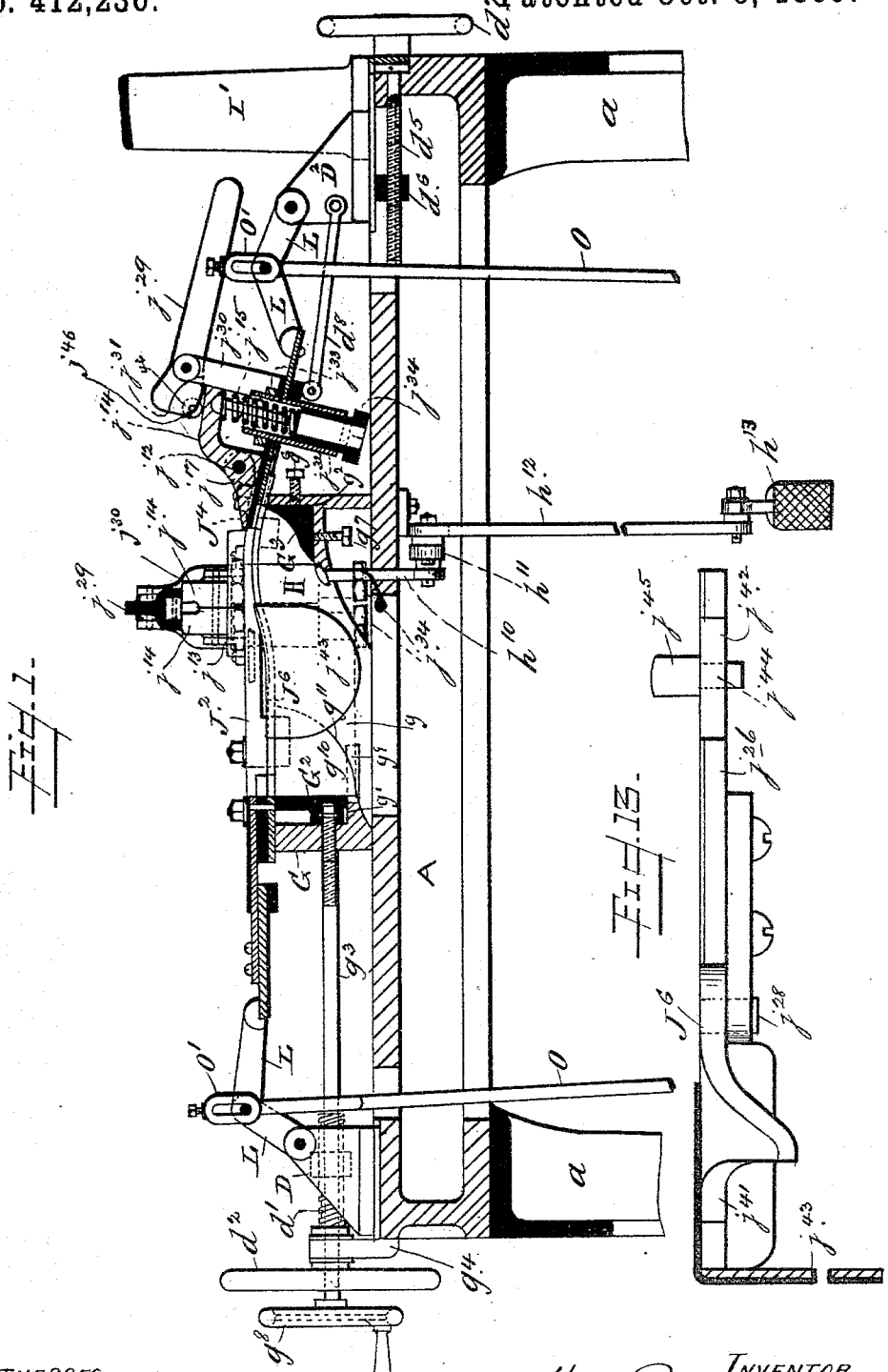

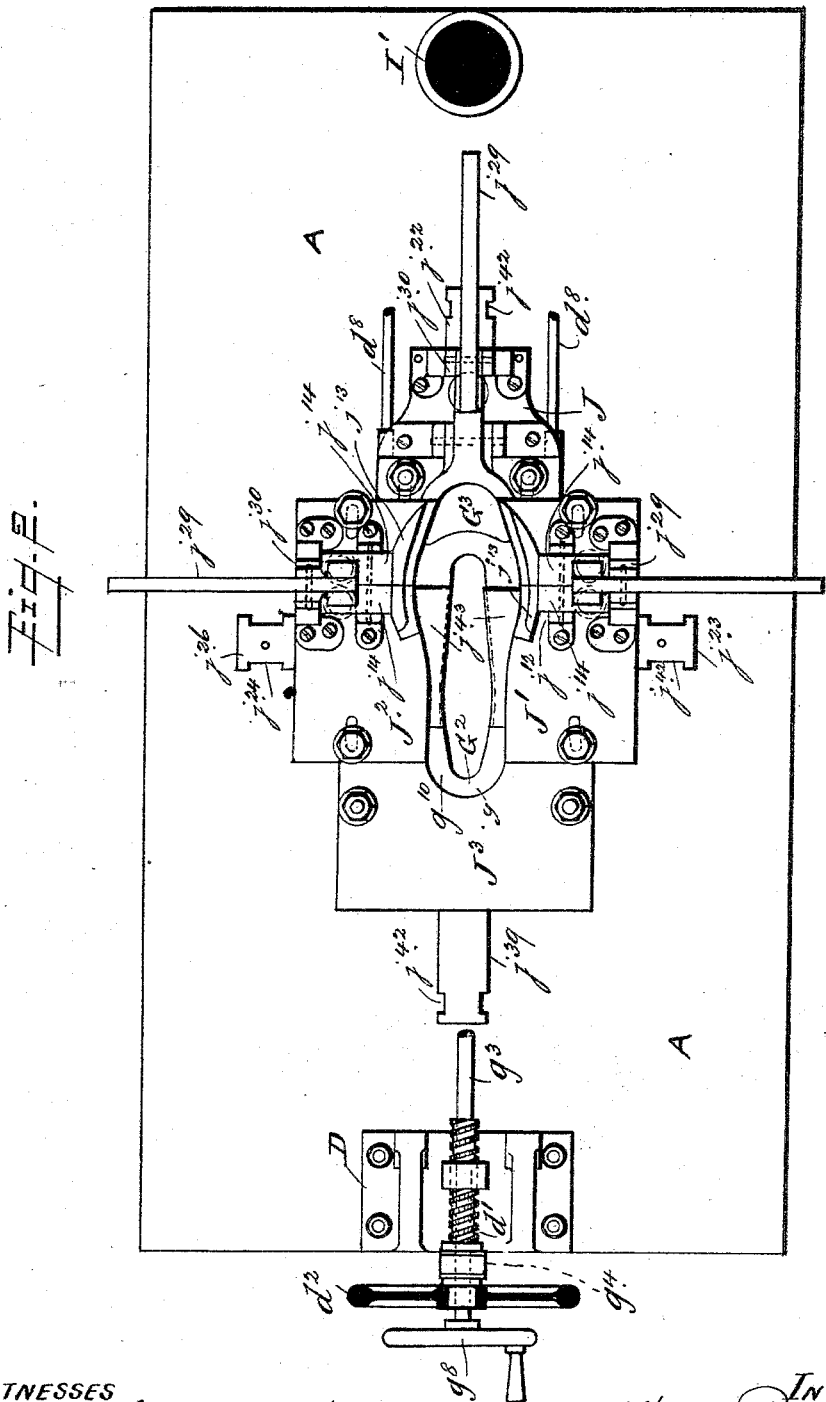

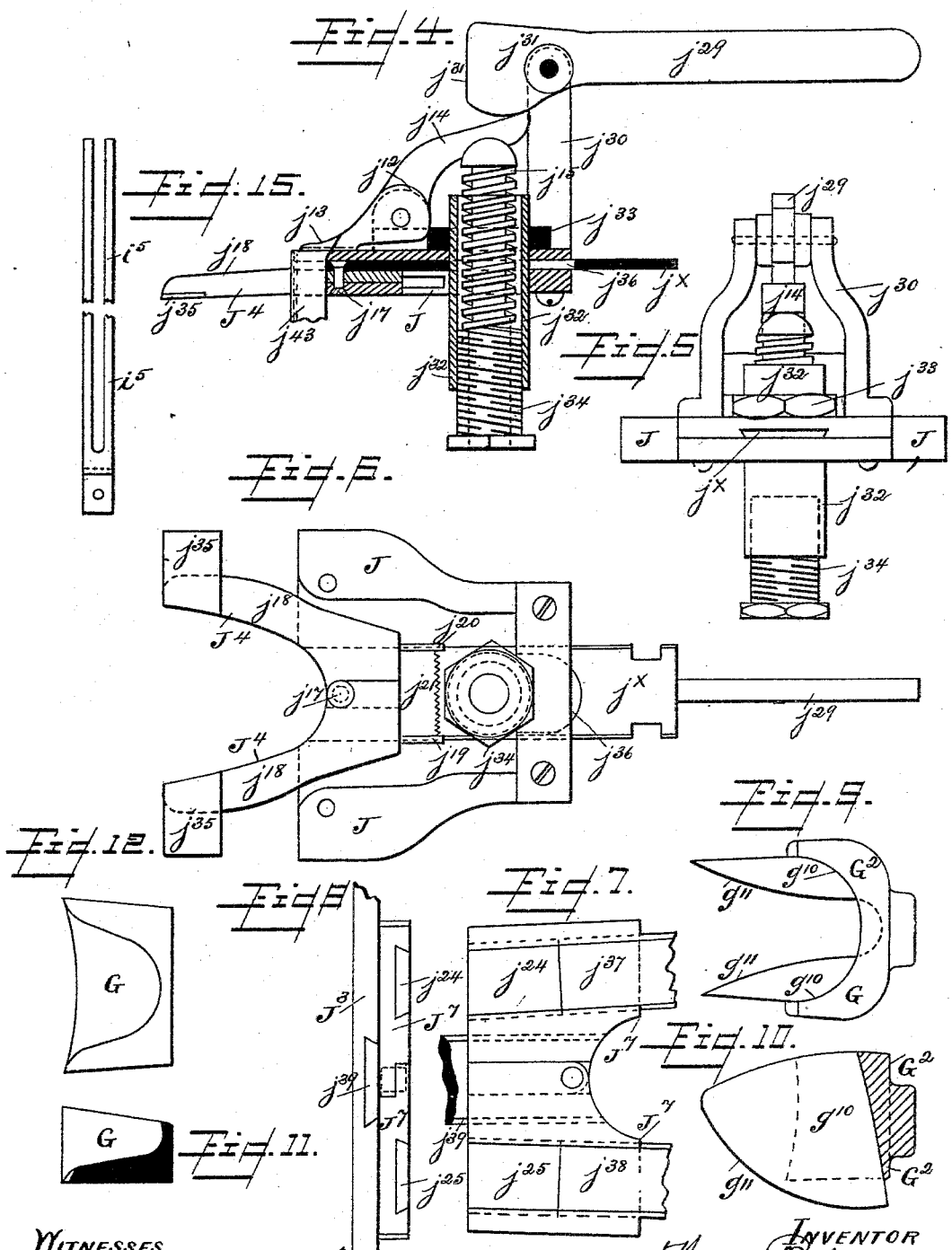

(No Model.) 6 Sheets—Sheet 5.
T. BRINING.
MACHINE FOR LASTING BOOTS OR SHOES.
No. 412,236. Patented Oct. 8, 1889.
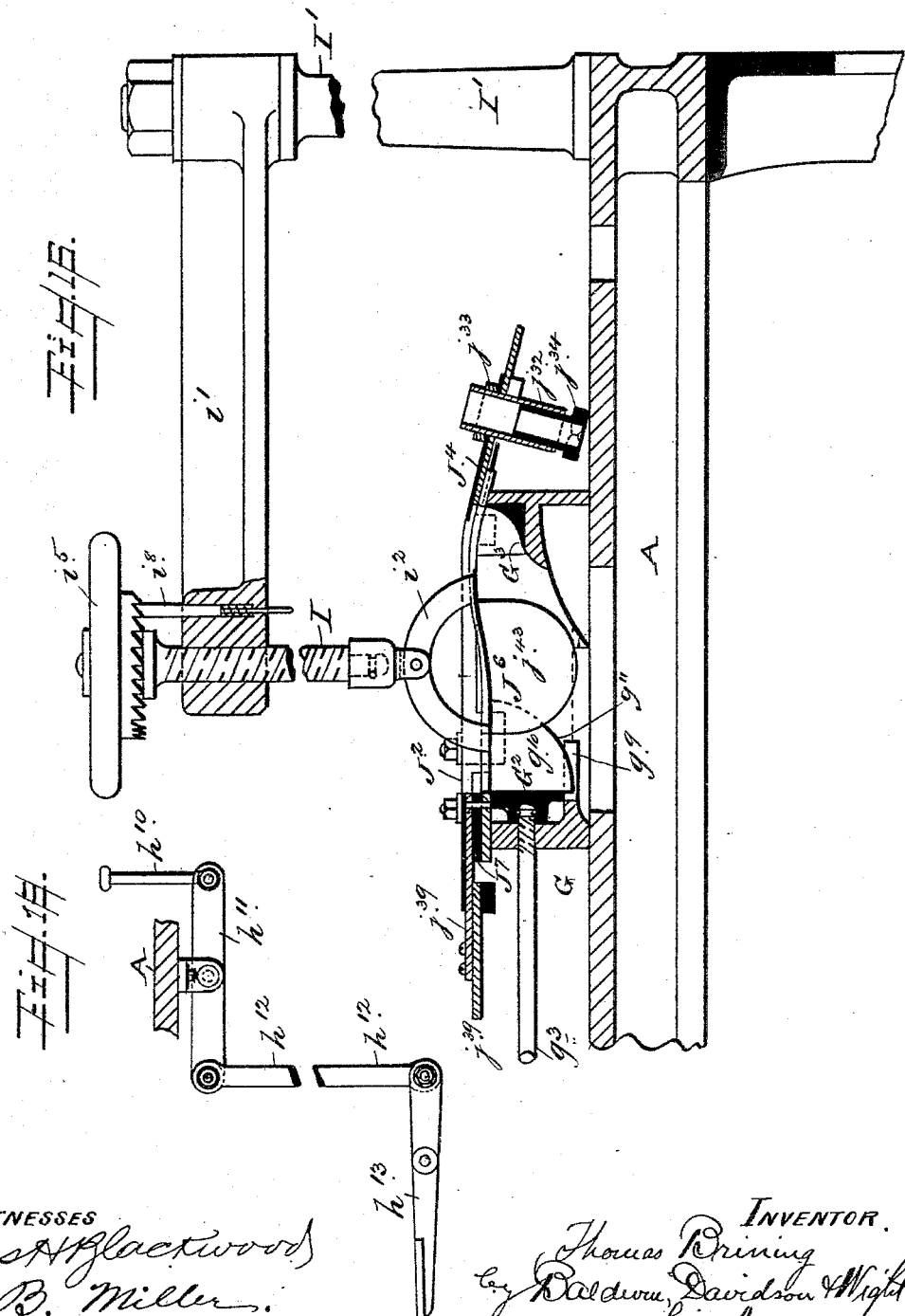
Witnesses
Jos H Blackwood
B. Miller
Inventor
Thomas Brining
by Baldwin, Davidson & Wight
his Attorneys (No Model.) 6 Sheets—Sheet 6.
T. BRINING.
MACHINE FOR LASTING BOOTS OR SHOES.
No. 412,236. Patented Oct. 8, 1889.
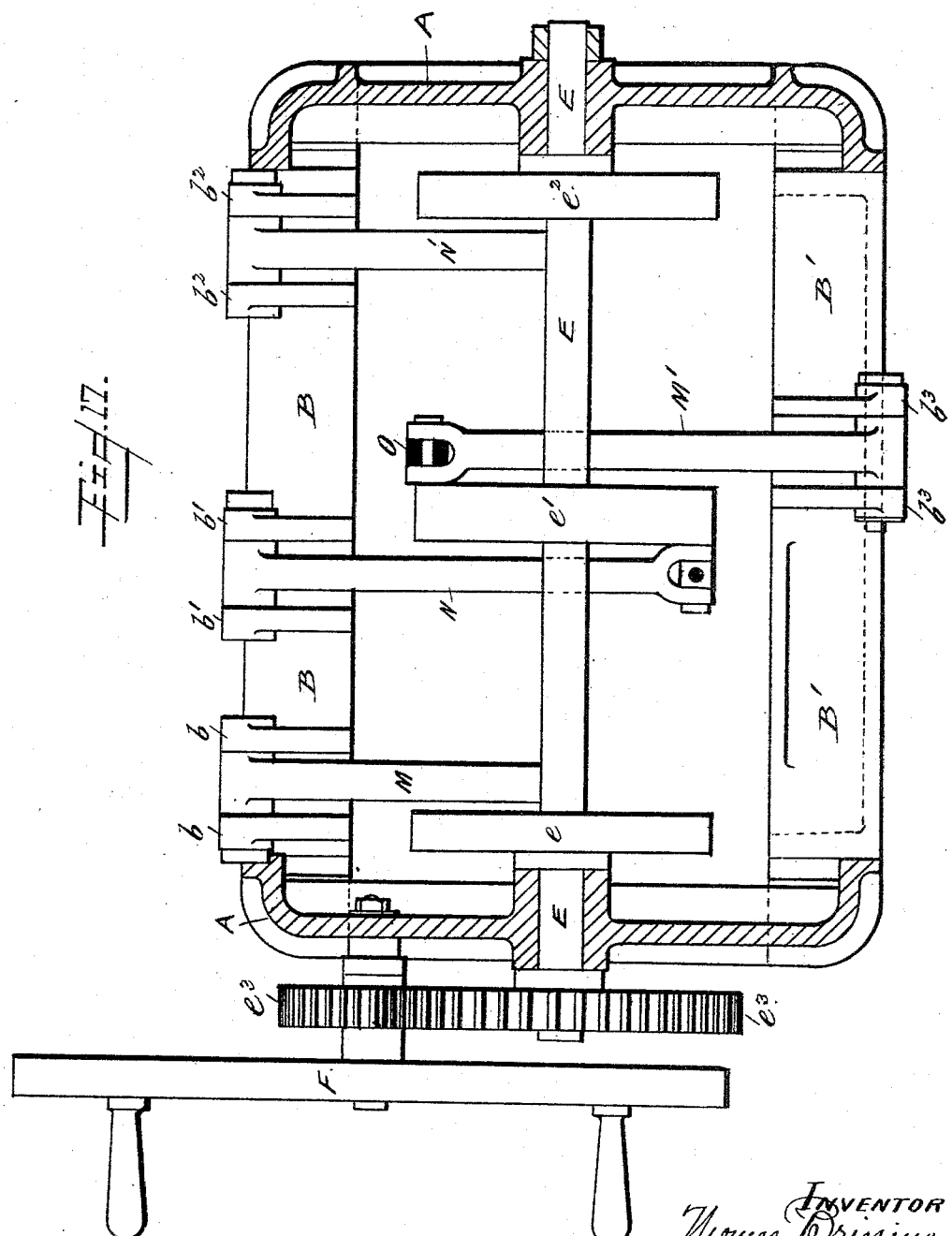

UNITED STATES PATENT OFFICE.

THOMAS BRINING, OF LEEDS, COUNTY OF YORK, ASSIGNOR OF ONE-HALF TO GEORGE LISTER, OF HEADINGLY, LEEDS, ENGLAND.

MACHINE FOR LASTING BOOTS OR SHOES.

SPECIFICATION forming part of Letters Patent No. 412,236, registered October 8, 1889.

Application filed April 1, 1889. Serial No. 305,574. (No model.) Patented in England November 20, 1888, No. 16,863; in France December 8, 1888, No. 191,995, and in Belgium December 8, 1888, No. 84,212.

*To all whom it may concern:*

Be it known that I, THOMAS BRINING, a subject of the Queen of Great Britain, residing at Leeds, in the county of York, England, have invented new and useful Improvements in Machines for Lasting Boots or Shoes, (for which I have obtained provisional protection in Great Britain, No. 16,863, bearing date November 20, 1888, and patents of addition in France, No. 191,995, bearing date December 8, 1888, and in Belgium, No. 84,212, dated December 8, 1888,) of which the following is a specification.

This invention relates to improvements in lasting-machines such as are described in the specification accompanying my application for Letters Patent in the United States filed on the 26th day of December, 1888, No. 294,606; and the objects of these improvements are, first, to provide a mold which is capable of adjustment for sizes or fittings of boots or shoes ranging from 11's to 1's, or from 7's to 10's, or from 4's to 6's, or from 2's to 5's, women's or men's, "rights" or "lefts," thus requiring only one mold for each of the above sizes, dispensing with the use of so many molds and saving the labor and expense attending the changing of the same; second, to afford facilities for adjusting the grippers to the varying thicknesses of boot and shoe "uppers," and, third, to provide means for retaining the pressure upon the last during the closing of the edges of the upper over the insole. I attain these objects by mechanism illustrated in the accompanying drawings, in which—

Figure 1 is a longitudinal section, and Fig. 2 a plan, looking at the top of adjustable mold fixed to the table of the machine; Fig. 3, a plan looking at the under side of wiper-plate arrangement. Figs. 4, 5, and 6 are, respectively, enlarged sectional elevation, end elevation, and plan, looking at the under side of toe-wiper plate. Figs. 7 and 8 are, respectively, an enlarged plan and section of adjustable heel-piece. Figs. 9 and 10 are, respectively, an enlarged plan and end elevation of adjustable slide and carrier for regulating the position of the side wipers to the varying sizes of boots and shoes. Figs. 11 and 12 are, respectively, an enlarged sectional elevation and plan of removable toe-piece; Fig. 13, an enlarged elevation of one of the side wipers. Figs. 14 and 15 are details; Fig. 16, an elevation of means for retaining the pressure upon the last during the closing of the edges of the upper over the insole; Fig. 17, a plan of mechanism for actuating the wipers; Fig. 18, an elevation of means for raising the last.

Like parts are marked in all the views with the same letters of reference.

G is the body or outer casing of the mold, preferably made of cast-iron, and mounted upon the table A, so as to be removable therefrom, and it is made or formed with a portion of its recess $g$ shaped to correspond with the outer contour of the boot or shoe. At the heel and toe portions of the mold are provided recesses or cavities $g'$ $g^2$, for the reception of the adjustable heel and toe pieces or blocks $G^2$ $G^3$, which are shaped to correspond with the outer shape of the heel and toe portions of the boot or shoe. The recess or cavity $g'$ is preferably made longer than $g^2$ to permit of a greater movement of the heel-piece $G^2$ for increasing or diminishing the size or length of the mold. The toe-piece $G^3$ may also be moved backward and forward in its cavity $g^2$ (and set in position by set-screw $g^6$) for the same purpose. The heel-piece $G^2$ is moved backward or forward on the flanges $g^9$ in the cavity by means of a screw-shaft $g^8$, working through the center of a second screw $d'$ (to be hereinafter described) and actuated by a hand-wheel $g^8$. The adjustable heel-piece is also provided with a thin steel or other suitable metal plate $g^{10}$, bent or curved to the exact shape of the heel portion of a boot or shoe. This plate may also be beveled or chamfered on its edge $g^{11}$, so as to prevent the possibility of any mark or crease being left on the boot-upper when it has been lasted. The toe-piece $G^3$, which may be made of metal, gutta-percha, or any other suitable material, is shaped to suit the toe of the boot or shoe being operated upon, and is simply dropped into the recess or cavity $g^2$, and can be easily removed therefrom when it is required to change it for another shape or size. It may also be adjusted in a longitudinal direction by set-screw $g^6$, and in an upward direction, when required to provide for the varying thicknesses of boot or shoe uppers, by a set-screw $g^7$, armed at the end (which comes in contact with the toe-piece) with a piece of india-rubber.

Instead of making the metal plates J J' $J^2$ $J^3$ of the aforesaid specification to slide on the top of the mold, according to the present invention they are made a fixture thereon by means of bolts or screws, (see Figs. 1 and 2,) and on their under surfaces are cut or formed recesses, so as to provide a space between the top of the mold and the plate in which the wipers are made to work. In the fixed plates are also formed grooves for carrying the V-slides $j^{22}$, $j^{23}$, $j^{26}$, and $j^{39}$. To the inner ends of the slides $j^{22}$, $j^{23}$, and $j^{26}$ are pivoted at $j^{17}$ $j^{27}$ $j^{28}$ the toe and the two metal (steel, brass, or any other suitable material) side wipers $J^4$ $J^5$ $J^6$.

On the top of each of the plates J J' $J^2$ is mounted the gripping devices consisting of a gripper or plate $j^{13}$. The side plates $j^{13}$ are preferably made in two pieces, as shown at Figs. 1 and 2, and provided with two short arms $j^{14}$—that is, one arm on each portion of the plate. A short arm $j^{14}$ is also provided on the toe-gripping plate, as shown. Above each arm $j^{14}$ is pivoted to the brackets $j^{30}$ a cam or eccentric-ended lever $j^{29}$, provided with or without a runner $j^{46}$, (shown at Fig. 1,) for reducing the friction. When it is required to raise the jaw of the gripper $j^{13}$, the free end of the lever $j^{29}$ is pulled or drawn upward in the direction shown by arrow until the cam-shaped portion (or runner $j^{46}$) has depressed the arm $j^{14}$, and the upper portion of said arm presses against the flat surface $j^{31}$, where it is held until the lever is returned to the position shown in the drawings.

To impart the requisite tension to the grippers, under each arm $j^{14}$ is a spiral spring $j^{15}$, carrying a round-headed pin. The springs are mounted in tubes $j^{32}$, which are respectively supported by and from the plates J J' $J^2$ by a nut $j^{33}$. The tension of each spring is adjusted by a tube $j^{34}$, the end of which is screwed into the lower end of tube $j^{32}$, as shown.

The wiper $J^4$ (see Fig. 6) for the toe is preferably made of brass and of a similar description to that shown and described in the before-mentioned specification, only the ends of the shaped jaws $j^{18}$ are prolonged, as shown at Figs. 1, 2, 3, 4, and 6, and they are also provided with thin projecting plates $j^{35}$, which are made to pass under, and are held down when in operation by the side wipers $J^5$ and $J^6$. The slide $j^\times$, to which the toe-wiper is pivoted, is also provided with a slot-hole $j^{36}$, through which the tube $j^{32}$ passes.

The side wipers $J^5$ $J^6$ are pivoted to their respective slides $j^{23}$ $j^{26}$ at $j^{27}$ $j^{28}$, and work in the space between the top of the mold and the plates J' $J^2$, (formed by the recesses in the latter,) so as to operate in any required position. These wipers are shaped to correspond to the outer shape of the boot or shoe. In order to arrange them to fit any required range of sizes of boots or shoes, the ends $j^{38}$ $j^{37}$ are made to work in the guides $j^{24}$ $j^{25}$, formed in the hinged and shaped carrier or holder $J^7$, which is pivoted to the slide $j^{39}$, working in the plate $J^3$. The carrier $J^7$ is formed of two pieces of metal scarfed and pivoted together so as to form a hinge, and it is so arranged that when the heel-piece $G^2$ has been moved inward by the screw $g^8$ its position over the block may be adjusted by means of a second screw $d'$ and hand-wheel $d^2$, as hereinafter described. When the wipers $J^5$ $J^6$ are forced inward for closing the upper over the insole of the boot or shoe by arranging their ends $j^{37}$ $j^{38}$ to be held by and work in the slides $j^{24}$ $j^{25}$ the holder is thereby caused to open or work on its pivot and thus adjusts itself to the moving position of the wipers, but at the same time providing for its front and shaped portions to gather in the heel.

In order to permit of the side wipers being closed slightly in advance of the toe-wipers they are provided with recesses $j^{40}$ $j^{41}$, which are inclined as shown, so that when the toe-wiper is forced over the insole its free ends come in contact with the inclines and force them inward for gathering in the toe. The ends of each of the slides $j^{22}$ $j^{23}$ $j^{26}$ $j^{39}$ are provided with a recess $j^{42}$, that in the slides $j^{23}$ and $j^{26}$ being rather longer than in the other slides. In these recesses are passed the ends of the toggles L, and motion is imparted to the slides in a similar manner to that described in the aforesaid specification from cams $e$ $e'$ $e^2$ (through levers M M', N N', and rods O) on driving-shaft E, which receives its motion from hand-wheel F through spur-gearing $e^3$.

To enable the toggle at the heel of the mold G to always give the same amount of motion to the slide $j^{39}$ the bracket D, to which one end of a toggle L is attached, is made adjustable upon the table and is moved backward and forward, as required in a slide by means of the screw $d'$, carried in bracket $g^4$ and working in a nut attached to the bracket D and actuated by hand-wheel $d^2$. The bracket $D^2$, to which the toggle at the toe is attached, may also be made adjustable on the table A and is moved backward and forward in a slide by means of a screw $d^5$, carried in a bracket $d^6$ and working in a nut attached to bracket $D^2$ and actuated by a hand-wheel $d^7$.

In order to provide for a regular movement of the toe-wiper $J^4$, the plate J, in which it slides, is provided with slotted holes and connected to the bracket $D^2$ by means of rods $d^8$, (one on each side,) so that when any movement is imparted to the bracket by the screw $d^5$ the rods $d^8$ correspondingly push or pull the plate inward or outward, such movement being provided for by means of the slot-holes through which the attaching-screws pass. To each of the side and toe wipers is also attached a piece of leather or leather and india-rubber combined, as shown at Figs. 1, 4, and 13. The free ends of these pieces are allowed to pass into the mold, as shown, and when the boot or shoe upper and last have been forced into the mold by the screw I they are held tightly against the sides of the mold, and thus aid in bringing or drawing the upper up to and firmly over the shape of the last when the side and toe wipers are forced over the insole. By this means, and also by providing one or more holes $j^{14}$ in the slides $j^{23}$ and $j^{26}$, in which a pin $j^{45}$ may be inserted, against which the end of one of the toggles is arranged to work, while in the hole in the opposite slide no pin is inserted in order that its toggle may have room to slide in the recess—that is, there is a certain amount of lost motion—without operating the wiper, provision is thus made for lasting boots or shoes for the right or left foot in the same mold.

While for small factories, where room is a consideration, the arrangement just described for lasting "rights" and "lefts" in the same mold will be found to be very convenient, still, when preferred, the molds, as herein described, may be so constructed as only to last rights or lefts in separate molds; but such arrangement would involve the duplication of framing and actuating mechanism. The tension of the springs $j^{15}$ may be so adjusted that when the side and toe wipers have passed a suitable distance over the insole their continued inward movement will draw the edges of the upper from under the grippers.

In order to retain the pressure upon the last after it has been forced down into the mold (as described in the hereinbefore-mentioned specification) by screw I and bridge $i^3$ during the closing of the edges of the upper over the insole, I form on or attach to the boss of the hand-wheel $i^5$ a number of ratchet-teeth $i^7$, into which a spring pawl or catch $i^8$ is made to engage when the screw has been traversed down to the required distance. The spring-catch $i^8$ is carried vertically in the movable arm $i'$, which is shown pivoted at one end to a single pillar or support I', (see Fig. 16,) so as to be capable of being pushed by the fingers of the operator into the arm when it is not required to engage with the ratchet-teeth.

To more readily raise the last out of the mold after the lasting operation has been performed, instead of using the pivoted bar described in the aforesaid specification I employ a separate pin $h^{10}$, provided with a pad or cushion of soft material to prevent its free end from damaging the boot or shoe upper. This pin is carried in vertical bearings under the instep of the last and is attached at its lower end to a double-ended lever $h^{11}$, pivoted to the under side of table A. The opposite end of the lever is connected by means of a rod $h^{12}$ to a treadle $h^{13}$, pivoted to a bracket below the table or on the floor of the factory. When the treadle is depressed, the pin $h^{10}$ and last H are forced upward.

By arranging the hand-wheel F, treadle $h^{13}$, and means for adjusting the motion and position of the wipers, as shown in the drawings, the operator is enabled to have all the parts of machine under control, and can operate any part at pleasure from one side of the machine, instead of having to move to different positions for adjusting purposes.

Other parts of the machine and the mechanism for operating the wipers, as well as the action of the machine, may be the same as described in the aforesaid specification.

What I claim as my invention, and desire to be secured by Letters Patent, is—

1. In a lasting-machine, the combination, with a table A, mounted upon framing, of a hollow mold provided with cavities for the reception of heel and toe pieces, the removable heel and toe pieces adjustable in said cavities, fixed plates with which the mold is armed, grippers carried by the plates, and wipers working in recesses in the plates, substantially as described.

2. In a lasting-machine, the combination, with a hollow mold partially shaped to correspond to the contour of a boot or shoe, of the removable heel and toe pieces adjustable in cavities in the mold, a metal plate fixed to the heel-piece shaped to the contour of the heel portion of a boot or shoe, and screws and hand-wheels for adjusting the heel and toe pieces in the cavities of the mold.

3. In a lasting-machine, the combination, with a removable hollow mold and with removable and adjustable toe and heel pieces and shaped metal plate, the recessed plates J J' J$^2$ J$^3$, fixed to the top of said mold, the shaped wipers J$^4$ J$^5$ J$^6$ J$^7$, slides to which the wipers are pivoted, and mechanism, substantially as described, connected to the slides for giving them an intermittent reciprocating motion, substantially as described.

4. In a lasting-machine, the combination of plates J J' J$^2$ J$^3$, provided with recesses and grooves for the reception of the slides $j^{22}$ $j^{23}$ $j^{26}$ $j^{30}$, notched at one end and pivoted at the other end to hinged toe-wiper J$^4$, side wipers J$^5$ J$^6$, and shaped hinged carrier J$^7$, provided with slides $j^{24}$ $j^{25}$ for the reception of the ends of the side wipers, the projecting plates $j^{35}$, pins $j^{19}$ $j^{20}$, spring $j^{21}$, the pieces of flexible material $j^{13}$, fixed to the side and toe wipers, and pin $j^{45}$, all substantially as and for the purposes set forth.

5. In a lasting-machine, the combination, with a removable hollow mold, removable toe and adjustable heel and toe pieces, toe, side, and heel wipers actuated by mechanism, substantially as described, of the plates J J' J$^2$ J$^3$, bearings $j^{12}$, grippers $j^{13}$, brackets $j^{30}$, cam-ended levers and pulleys $j^{29}$, tension-springs $j^{15}$, tubes $j^{32}$, and nuts $j^{33}$ $j^{34}$, as and for the purposes described.

6. In a lasting-machine, the combination, with a removable hollow mold armed with fixed plates J J' J² J³, grippers $j^{13}$, and mechanism, substantially as described, for opening and imparting the required tension to the same, and with the wipers pivoted to intermittent reciprocating slides actuated by mechanism common to all, substantially as described, of the removable toe-piece adjusted by screws $g^6$ $g^7$, and the heel-pieces adjusted by screw $g^3$, and hand-wheel $g^5$ on flanges $g^9$, all substantially as shown.

7. In a lasting-machine, the combination of a removable hollow mold, removable toe-piece, and adjustable heel-piece, grippers, and adjustable side-wipers pivoted to slides and provided with inclined recesses for closing the hinged jaws of the toe-wipers for gathering in the toe after the edges of the upper have been closed over the insole at the waist of the boot or shoe, all substantially as shown.

8. In a lasting-machine, the combination, with the slides having wipers pivoted thereto at one end and notches formed at the other, of a shaft E, common to all the slides actuated by mechanism, as described, cams carried on said shaft, levers pivoted to the framing of the machine and armed with runners operating in said cams, rods having one end attached to levers and the other end loosely and adjustably connected to toggles L, having one of their ends connected to brackets on the table A and their free ends to the slides, said connections having play or lost motion to permit of them operating the slides simultaneously or successively, all substantially as shown.

9. In a lasting-machine, the combination of a removable hollow mold provided with a removable and adjustable toe-piece, fixed plates armed with grippers, and sliding toe and side wipers armed with pieces of flexible material, with the heel-piece armed with a metal-shaped plate $g^{10}$; mechanism, substantially as described, for adjusting the plate, the hinged-shaped carrier provided with slides receiving side-wiper ends, said carrier being pivoted to intermittent reciprocating slide $j^{39}$, adjusted to the movement of heel-piece, toggle L, adjusted bracket D, screw and nut $d'$, and hand-wheel $d^2$, all substantially as shown.

10. In a lasting-machine, the combination of the table A, mounted upon framing, hollow removable and adjustable mold partially shaped to the outer contour of the boot or shoe, removable and adjustable heel and toe pieces G² G³, cavities $g'$ $g^2$, screws $g^3$ $g^6$ $g^7$, hand-wheel $g^8$, flanges $g^9$, shaped metal piece $g^{10}$, fixed plates J J' J² J³, slides $j^{22}$ $j^{23}$ $j^{26}$ $j^{39}$, pivoted and hinged toe-wiper J⁴, pins $j^{19}$ $j^{20}$, spring $j^{21}$, side wipers J⁵ J⁶, flexible material $j^{13}$, brackets $j^{30}$, cam-levers $j^{29}$, grippers $j^{13}$, arms $j^{14}$, tension-springs $j^{15}$, tubes $j^{32}$, nuts $j^{33}$ $j^{34}$, shaped hinged carrier J⁷, provided with slides $j^{24}$ $j^{25}$, brackets D D' D² D³, adjusting-screws $d'$ $d^5$, hand-wheels $d^2$ $d^6$, rods $d^8$, toggles L, and mechanism, substantially as described, for operating the same, pin $j^{45}$, pillar I', screw I, arm $i'$, bridge $i^2$, hand-wheel $i^5$, ratchet-teeth $i^7$, catch $i^8$, pin $h^{10}$, double-ended lever $h^{11}$, rod $h^{12}$, and treadle $h^{13}$, all substantially as and for the purposes herein set forth.

In testimony whereof I have hereunto signed my name to this specification in presence of two subscribing witnesses.

THOMAS BRINING.

Witnesses:
GEORGE LISTER,
W. FAIRBURN-HART.